(12) United States Patent
Innings

(10) Patent No.: US 10,004,244 B2
(45) Date of Patent: Jun. 26, 2018

(54) ADJUSTABLE STEAM INJECTOR

(75) Inventor: Fredrik Innings, Torna Hällestad (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 1841 days.

(21) Appl. No.: 12/867,929

(22) PCT Filed: Jan. 13, 2009

(86) PCT No.: PCT/SE2009/000006
§ 371 (c)(1),
(2), (4) Date: Sep. 20, 2010

(87) PCT Pub. No.: WO2009/105004
PCT Pub. Date: Aug. 27, 2009

(65) Prior Publication Data
US 2011/0005408 A1    Jan. 13, 2011

(30) Foreign Application Priority Data
Feb. 20, 2008 (SE) ...................... 0800378

(51) Int. Cl.
*A23C 3/02* (2006.01)
*A23C 3/037* (2006.01)
(Continued)

(52) U.S. Cl.
CPC .............. *A23C 3/037* (2013.01); *A23C 13/08* (2013.01); *A23L 3/22* (2013.01); *F04F 5/461* (2013.01); *F28C 3/06* (2013.01)

(58) Field of Classification Search
CPC ... A23L 3/16; A23L 3/22; A23C 3/033; A23C 3/037; A23C 13/08; A23C 3/16; A23C 3/02; F04F 5/461; F28C 3/06
(Continued)

(56) References Cited

U.S. PATENT DOCUMENTS 2,117,647 A * 5/1938 Boehm .................... 239/117
3,927,974 A   12/1975 Johansson et al.
(Continued)

FOREIGN PATENT DOCUMENTS

SE    367 121 B    5/1974
SE    508 217 C2   9/1998
(Continued)

OTHER PUBLICATIONS

International Search Report (PCT/ISA/210) dated May 20, 2009, by Swedish Patent Office as the International Searching Authority for International Application No. PCT/SE2009/000006.

*Primary Examiner* — Michael Hoang
(74) *Attorney, Agent, or Firm* — Buchanan Ingersoll & Rooney PC

(57) ABSTRACT

The invention relates to an adjustable steam injector of the type which has an injector housing with an inlet for a product which is to be heated and an inlet for steam. The injector housing also has an outlet for the product mixed with steam. The injector also includes an injector body displaceable in the injector housing. About the front end of the injector body there are disposed concentric gaps for product and steam, respectively. The injector body has a recess in its front end. The recess has the same extent as the cross sectional surface of the injector body and has its greatest depth in the center of the injector body.

16 Claims, 2 Drawing Sheets

(51) Int. Cl.
*A23C 13/08* (2006.01)
*A23L 3/22* (2006.01)
*F04F 5/46* (2006.01)
*F28C 3/06* (2006.01)

(58) Field of Classification Search
USPC .......... 99/467, 477, 491, 452–453, 483–485; 126/348, 379.1, 389.1
See application file for complete search history.

(56) References Cited

U.S. PATENT DOCUMENTS

| | | | |
|---|---|---|---|
| 6,082,712 | A | 7/2000 | Cincotta et al. |
| 6,361,025 | B1 | 3/2002 | Cincotta et al. |
| 6,708,709 | B1 * | 3/2004 | Palm ................................ 137/13 |
| 2006/0237859 | A1 | 10/2006 | Lopez et al. |

FOREIGN PATENT DOCUMENTS

| | | |
|---|---|---|
| SE | 527 982 C2 | 7/2006 |
| WO | WO 02/01970 A2 | 1/2002 |
| WO | WO 2008/060218 A1 | 5/2008 |

\* cited by examiner

ADJUSTABLE STEAM INJECTOR

TECHNICAL FIELD

The present invention relates to an adjustable steam injector comprising an injector housing with an inlet for a product, a steam inlet, as well as an outlet for the steam-mixed product, the injector further including an injector body displaceable in the injector housing, there being provided about the forward end of said injector body concentric gaps for product and steam, respectively.

BACKGROUND ART

As regards the heat treatment of liquid or pumpable foods, use may be made of steam in order to heat the food product in a rapid and efficient manner. One of the methods which is used to inject steam direct into the product is by means of an injector.

Depending upon the temperature to which it is desired to heat the product, it is possible to obtain a pasteurized or an aseptic product, or alternatively a product with extended shelf-life in cold storage. The commonest practice is to heat the product, which may, for example, be dairy produce, juices, viscous food products or the like, to a temperature where a total extermination of harmful microorganisms is obtained. This gives a food product which maintains its stability on storage at room temperature. No unbroken refrigerated chain for storage is necessary, which may be an advantage above all in the developing countries.

Direct heating of the product by injecting steam into the product gives a rapid and efficient heating. As a result of this rapid method, it is possible to reduce the treatment time, which in total gives a reduced thermal effect on the product and a product will be obtained which maintains a higher quality, above all in terms of flavour.

There are a large number of injectors available on the market which all share a similar construction, with an inlet for the product which is to be treated and an outlet for the ready-treated product. The injector further displays an inlet for steam, under high pressure, which by various arrangements with gaps or channels is caused to converge with the product and which heats it to the desired temperature.

Swedish Patent Specification SE 367 121 describes a so-called annular gap injector, where concentric gaps for steam and product are disposed about a centre shaft. The annular gap injectors are known for their operational reliability but may occasionally become choked because of product burning onto surfaces, so-called fouling. In order to obviate this problem, the centre shaft has been extended, which often may be a sufficient measure. But on occasions the hot steam succeeds in passing through the colder layer of product and fouling nevertheless occurs.

OBJECTS OF THE INVENTION

One object of the present invention is to realise an injector whose design and construction enjoys all of the advantages of an annular gap injector, but where no or minimum risk arises for the centre shaft and its surrounding gaps to be choked because of fouling.

Solution

This and other objects have been achieved according to the present invention in that the steam injector of the type described by way of introduction has been given the characterising feature that the injector body is provided in its front end with a recess.

Preferred embodiments of the present invention have further been given the characterising features as set forth in the appended subclaims.

BRIEF DESCRIPTION OF THE ACCOMPANYING DRAWINGS

One preferred embodiment of the present invention will now be described in greater detail hereinbelow, with reference to the accompanying Drawings. In the accompanying Drawings.

The accompanying Drawings show only those details essential to an understanding of the present invention, and the positioning of the injector in a heat treatment plant, which is well-known to a person skilled in the art, has been omitted.

DESCRIPTION OF PREFERRED EMBODIMENT

Figure 1:
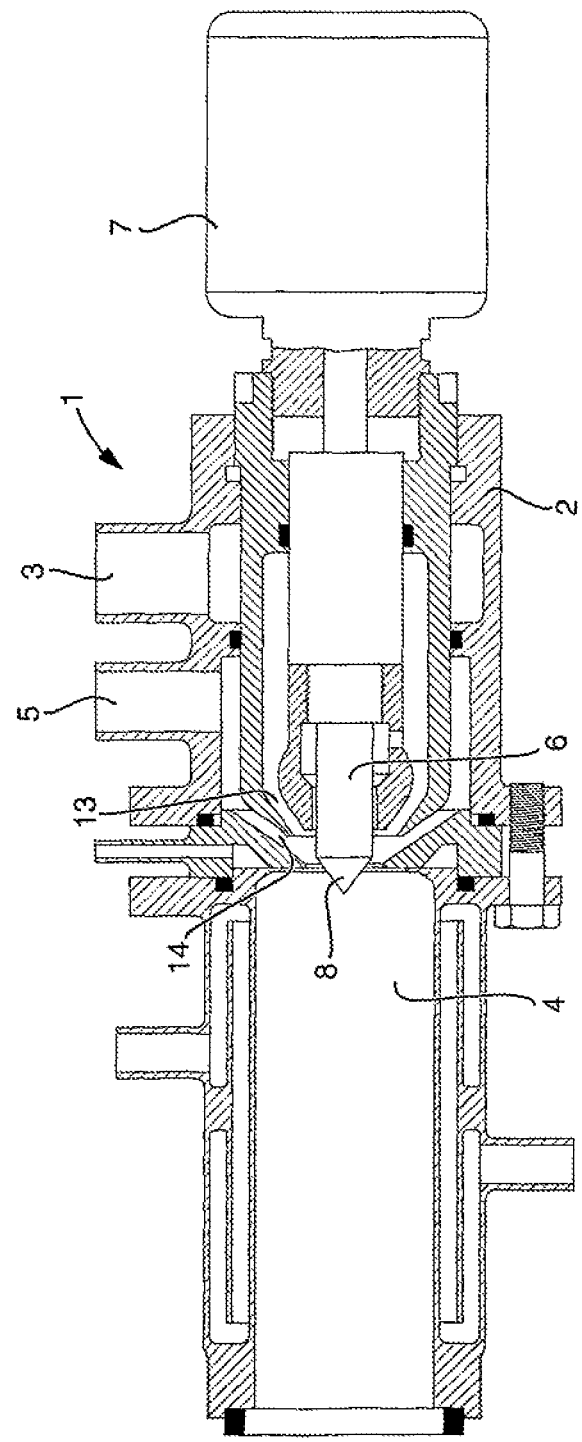
FIG. 1 shows, partly in section, a side elevation of a prior art injector.

FIG. 1 illustrates a prior art steam injector 1. The steam injector 1 includes a closed injector housing 2, of substantially tubular appearance. The injector housing 2 displays an inlet 3 for a product which is to be heat treated in the injector 1, as well as an outlet 4 for the heat treated product. The injector housing 2 also has an inlet 5 for steam. The injector housing 2 is suitably manufactured from stainless steel, so that it is suitable for use for foods and so that it is easy to clean in an efficient manner.

Inside the injector housing 2, there is disposed an injector body 6 which is displaceable in the longitudinal direction of the injector housing 2. In the rear end of the injector body 6, there is disposed some form of regulator device 7. The regulator device 7 may be manual or automatic and, by displacing the injector body 6, it is possible thus to adjust the capacity of the injector 1.

Figure 2:
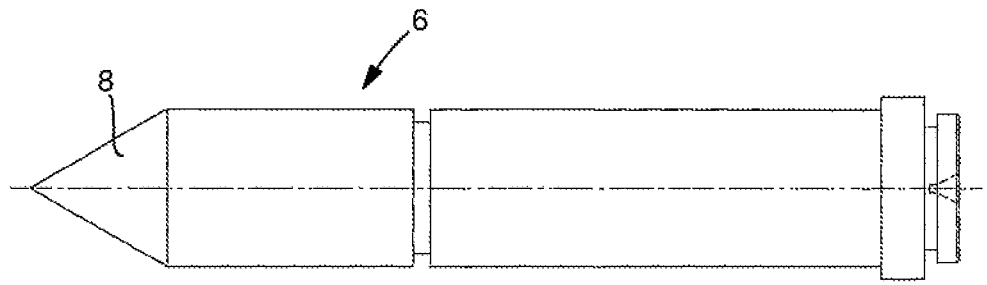
FIG. 2 shows a side elevation of a prior art injector body.

According to the prior art, a centre shaft 8 is positioned in the front end of the injector body 6. The centre shaft 8 and the injector housing 2 are designed such that there are formed, around the centre shaft 8, concentric gaps, of which at least one gap 13 is intended for product and at least one gap 14 is intended for steam. As a result of the adjustability of the injector body 6, it is possible to regulate the gap 13 for the product flow. Both the centre shaft 8 and the injector body 6 are suitably manufactured from stainless steel, so that they are suitable to be used for foods and so that they are easy to clean in an efficient manner. The injector body according to the prior art is illustrated in detail in FIG. 2.

Figure 3:
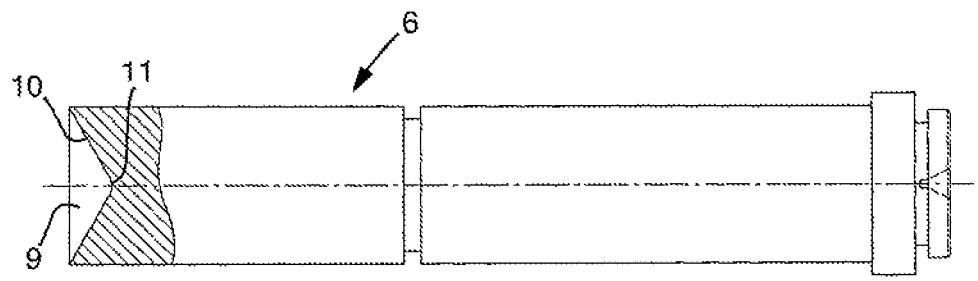
FIG. 3 shows, partly in section, a side elevation of a first preferred embodiment of an injector body according to the invention.
Figure 4:
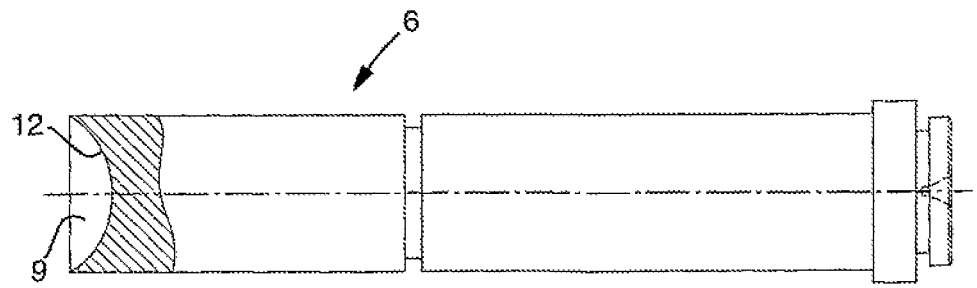
FIG. 4 shows, partly in section, a side elevation of a second preferred embodiment of an injector body according to the present invention.

A first preferred embodiment of an injector body according to the invention is shown in FIG. 3. The injector body 6 completely lacks the centre shaft 8. Instead, the injector body 6 has in its forward end a recess 9. The recess 9 has the same extent as the cross sectional area of the injector body 6. In the first preferred embodiment of the present invention, the recess 9 has straight side edges 10. The side edges 10 meet in the centre of the injector body with a gently rounded transition 11.

The recess 9 has its greatest depth in the centre of the injector body 6. The depth is determined by the fact that the side edges 10 meet at an angle of 90-180°, preferably 100-150° and in the preferred embodiment 110-130°.

In the second preferred embodiment of the present invention, the recess 9 forms, in the front end of the injector body 6, a cup-shaped surface 12. The cup-shaped surface 12 has its greatest depth in the centre of the injector body 6. The depth corresponds to the depth of the recess 9 in the first preferred embodiment.

The product which enters into the injector 1 through the product inlet 3 may be a liquid or semi-viscous product, such as milk, cream or the like.

The product which passes in through the inlet 3 into the injector housing 2 passes the gap 13 and, when it leaves the gap, will be formed into a concentric layer. The product gap converges with the steam which enters via the inlet 5 and then passes the gap 14. The product and the steam converge under pressure and at great speed, ahead of the front end of the injector body 6.

Since the injector body 6 has no centre shaft 8 according to the invention, there is no surface to which the product can be burnt and fouled. Even if it penetrates through the product layer, the steam has no surface which it can heat up. As a result of the design of the injector body 6, those surfaces which may suffer from fouling are moved away from the flow of product and steam. The rapidly ready-heated product thereafter departs from the injector 1 through the outlet 4.

As will have been apparent from the foregoing description, the present invention realises an adjustable steam injector which enjoys the advantages of the conventional annular gap injector as regards operational reliability. By minimizing the risk of fouling of the product, a contribution has been made to further extending operational times.

The present invention should not be considered as restricted to that described above and shown on the Drawings, many modifications being conceivable without departing from the scope of the appended Claims.

What is claimed is:

1. An adjustable steam injector comprising
an injector housing with an inlet for a product,
a steam inlet and an outlet for the product mixed with steam,
the injector further including an injector body displaceable in the injector housing, there being provided about a front end of said injector body concentric gaps for product and steam, respectively,
wherein the injector body displays in its front end a recess so that the front end of the injector body is a recessed front end, the recess having the same extent as a cross sectional surface of the injector body and having its greatest depth in a centre of the injector body; and
the injector body preventing fouling by being displaced so that the product and the steam converge ahead of the recessed front end of said injector body.

2. The adjustable steam injector as claimed in claim 1, wherein the recess has straight side edges.

3. The adjustable steam injector as claimed in claim 2, wherein the side edges meet and make an angle of 90-180°.

4. The adjustable steam injector as claimed in claim 2, wherein the side edges meet and make an angle of 100-150°.

5. The adjustable steam injector as claimed in claim 2, wherein the side edges meet and make an angle of 110-130°.

6. The adjustable steam injector as claimed in claim 1, wherein the recess forms a cup-shaped surface.

7. An adjustable steam injector comprising:
a tubular injector housing possessing an interior in which is provided at least one steam gap and at least one product gap;
a product inlet on the tubular injector housing in communication with the at least one product gap for introducing liquid product into the at least one product gap in the tubular injector housing;
a steam inlet on the tubular injector housing in communication with the at least one steam gap for introducing steam into the at least one steam gap in the tubular injector housing;
the at least one product gap and the at least one steam gap being concentrically arranged in the interior of the tubular injector housing so that the liquid product passing through the at least one product gap and the steam passing through the at least one steam gap are mixed together;
the tubular injector housing possessing an outlet in communication with the at least one product gap and the at least one steam gap so that the liquid product mixed with the steam flows into the outlet;
an injector body displaceable in the interior of the injector housing, the displaceable injector body possessing a cross-sectional surface;
a regulator device connected to the injector body to displace the injector body and thereby adjust a capacity of the steam injector;
the displaceable injector body possessing a front end around which are concentrically arranged the at least one product gap and the at least one steam gap;
the front end of the displaceable injector body possessing a front end surface facing towards the outlet, the front end surface being provided with a recess such that the front end is recessed in a direction away from the outlet to prevent fouling of a front end section of the displaceable injector body, the recess possessing an outer peripheral extent that is the same as the cross-sectional surface of the injector body;
the front end surface of the injector body having a centre as seen from the front end, the recess possessing a greatest depth in the centre of the injector body; and
the injector body preventing fouling by being displaced so that the product and steam converge ahead of the recessed front end of the injector body.

8. The adjustable steam injector as claimed in claim 7, wherein the recess possesses an outer periphery and straight side edges extending from the outer periphery to the centre.

9. The adjustable steam injector as claimed in claim 8, wherein the side edges meet and form an angle between the two sides edges of 90-180°.

10. The adjustable steam injector as claimed in claim 8, wherein the side edges meet and form an angle between the two sides edges of 100-150°.

11. The adjustable steam injector as claimed in claim 8, wherein the side edges meet and form an angle between the two sides edges of 110-130°.

12. The adjustable steam injector as claimed in claim 7, wherein the recess is a cup-shaped recess.

13. An adjustable steam injector comprising:
a tubular injector housing possessing an interior in which is provided at least one steam gap and at least one food product gap;
a food product inlet on the tubular injector housing in communication with the at least one food product gap for introducing food product into the at least one food product gap in the tubular injector housing;

a steam inlet on the tubular injector housing in communication with the at least one steam gap for introducing steam into the at least one steam gap in the tubular injector housing;

the at least one food product gap and the at least one steam gap being concentrically arranged in the interior of the tubular injector housing so that the food product passing through the at least one food product gap and the steam passing through the at least one steam gap are mixed together;

the tubular injector housing possessing an outlet in communication with the at least one food product gap and the at least one steam gap so that the food product mixed with the steam flows into the outlet;

an injector body displaceable in the interior of the injector housing to adjust capacity of the injector, the displaceable injector body possessing a cross-sectional surface;

the displaceable injector body possessing a front end around which are concentrically arranged the at least one food product gap and the at least one steam gap;

the front end of the displaceable injector body possessing a front end surface facing towards the outlet, the front end surface being provided with a recess such that the front end is recessed in a direction away from the outlet, the recess possessing an outer peripheral extent that is the same as the cross-sectional surface of the injector body;

the front end surface of the injector body having a centre as seen from the front end, the recess possessing a greatest depth in the centre of the injector body; and the injector body preventing fouling by being displaced so that the product and the steam converge ahead of the recessed front end of the injector body.

14. The adjustable steam injector as claimed in claim 13, wherein the recess possesses an outer periphery and straight side edges extending from the outer periphery to the centre.

15. The adjustable steam injector as claimed in claim 13, wherein the side edges meet and form an angle between the two sides edges of 90-180°.

16. The adjustable steam injector as claimed in claim 13, wherein the recess is a cup-shaped recess.

* * * * *